Jan. 16, 1951     C. C. FOX ET AL     2,538,306

FISHING ROD

Filed Aug. 2, 1948

Dale E. Willits
Clifton C. Fox
             INVENTORS

BY *Clarence A. O'Brien*
*and Harvey B. Jacobson*
                              Attorneys Patented Jan. 16, 1951

2,538,306

UNITED STATES PATENT OFFICE 2,538,306

FISHING ROD

Clifton C. Fox and Dale E. Willits,
Columbus, Nebr.

Application August 2, 1948, Serial No. 42,068

4 Claims. (Cl. 43—18)

This invention relates to fishing rods and is intended to provide maximum flexibility for the rod without the necessity for increasing the length of the rod in order to obtain such flexible casting, this being of particular advantage where room for casting is limited, or where there are a plurality of fishermen, all grouped together, as in a boat, and where ordinarily the fly-casting of each would interfere with the others.

It is a primary object of the invention to provide a relatively short rod that is extremely flexible and thereby can compensate for the long leverage generally employed in throwing out the line, such maximum advantage being procured by the provision of a spring integral with the rod, whereby casting is possible from any position.

And another object of the invention is to provide a fishing rod that is balanced, reduces backlash of the line, and materially reduces breakage in the line.

Yet another object of the invention is to provide a flexible rod that is readily carried about, or stored, occupying very little space, and is simple and durable in construction, and economical in manufacture.

Other objects of the invention reside in the details of construction and in the combination of the various parts and in their mode of operation, as will hereinafter appear.

Figure 1:
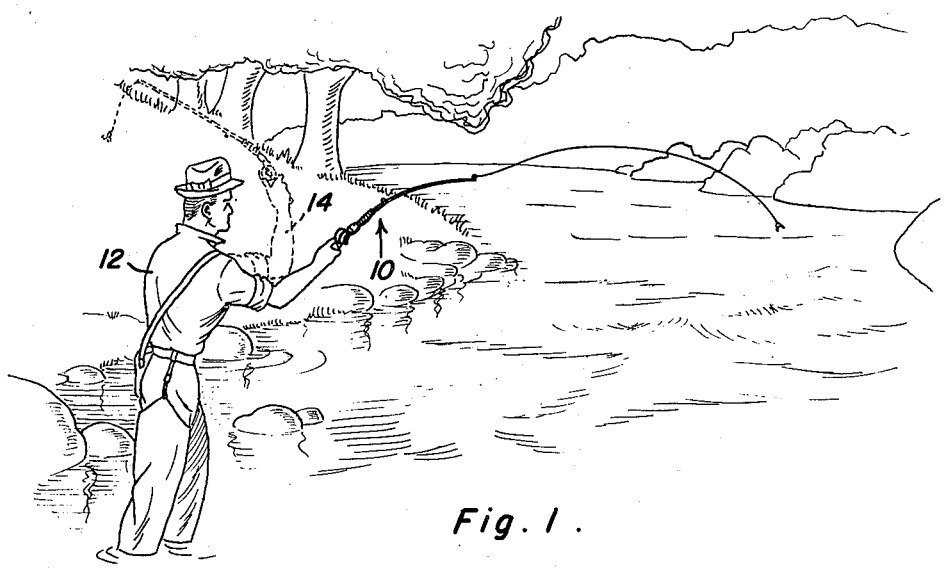
Figure 2:
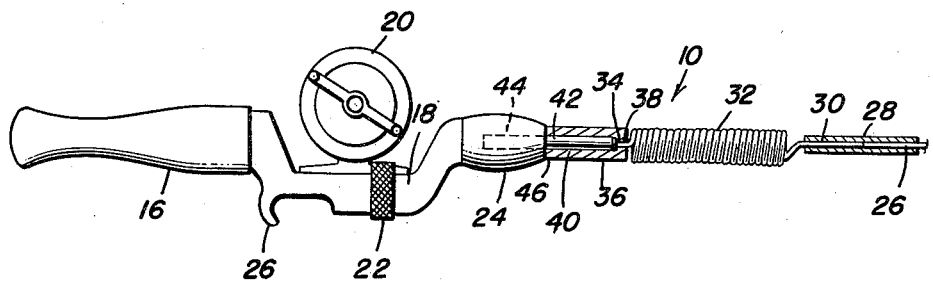
Figure 3:
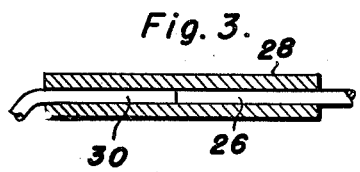

The following is a detailed description of a preferred embodiment of the invention and is illustrated in the accompanying drawings, wherein:

Figure 1 is a perspective view of the invention and is illustrated in operation in a stream; and, Figure 2 is a side elevation shown in connection with a rod and handle.

Referring to the figures, the fishing rod is shown in its entirety and is illustrated generally by numeral 10, being retained in the hand of a fisherman 12 with the fishing line unreeled. The dotted line showing 14 illustrates the relatively small space required by the fisherman when he draws his arm back to cast.

Referring specifically to Figure 2, there is illustrated fishing rod 10 in greater detail, and discloses the handle or butt portion 16 retaining thereon in a suitable seat 18 a reel 20 secured thereon by means of clamp 22, handle or butt 16 terminating in a ferrule or socket portion 24. The usual finger-grip or guard 26 is provided. As these details of handle construction are conventional and form no part of the instant invention, it is believed that a more detailed description thereof will not be necessary.

Rod member 26 is of the usual spring steel construction and is readily flexible, the instant rod member differing from usual rods in that it is of considerably shorter length. The inner end of rod 26 is press-fit or otherwise immovably secured in a sleeve 28 and extends approximately half the distance therein. The free end 30, of a helical or spiral spring 32 is also press-fit or otherwise secured firmly in the remaining half of sleeve 28, spring 32 including a free end portion at the opposite extremity thereof at 34. Extremity 34 is adapted to seat in a boss 36 suitably bored at 38 therefor.

Boss 36 is counterbored the major horizontal length thereof at 40 and retains therein bar or rod 42. Bar 42 extends beyond the outer extremity of boss 36 and is adapted to seat within ferrule or socket 24 in an aligned counterbore 44 therein.

In assembly, rod 42 is frictionally seated in socket 24 and is retained therein by such frictional fit when it is in use. Shoulder 46 acts as stop means for inward movement of rod 40.

The invention is now ready for use, and due to the fact that coil spring 32 is secured to rod member 26, extreme flexibility of operation is provided. The length of rod 26 is now considerably shorter, while still obtaining the maximum casting leverage or generally desired, thus enabling a far greater accuracy in casting by the fisherman. He is also now able to cast around trees and brush because of the maximum flexibility provided to the operation of spring 32. While rod 26 and spring 32 have been disclosed as separate structure jointed by sleeve 28, of course, it is readily understood that the spring and rod members may be made of unitary construction, and thereby eliminating the necessity for use of sleeve 28 without sacrificing any of the efficiency of operation.

While any suitable material may be employed, it is generally preferred that the handle be cast from aluminum and spring 32 may be made integral with boss 36.

While one complete embodiment of the invention has been described in detail, it is to be understood that various features of the invention may be independently used and also that numerous modifications might be made by those skilled in the art, without departing from the spirit and scope of the invention, as indicated above and in the following claims.

Having described the invention, what is claimed as new is:

1. A fishing rod construction comprising a handle having a socket end, a shaft mounted in said socket and extending outwardly therefrom, a boss concentrically disposed about the shaft and abutting against the socket, a helical spring having one end mounted in the boss and the opposing end being straight, a member receiving said last end and a rod carried by the member.

2. A fishing rod construction comprising a handle having a socket end, a shaft mounted in said socket and extending outwardly therefrom, a boss concentrically disposed about the shaft and abutting against the socket, a helical spring having one end secured in the boss, a member secured on the opposing end of the spring, and a rod secured to the member.

3. In a fishing rod construction including a rod and a handle, means for flexibly and extensibly connecting the rod to said handle comprising a socket formed on one end of the handle, a shaft mounted in the socket and projecting therefrom, a boss embracing said shaft and abutting against the socket, a helical spring having one end mounted in the boss, and means for attaching the opposing end of the spring to the rod.

4. In a fishing rod construction including a rod and a handle, means for flexibly and extensibly connecting the rod to said handle comprising a socket formed on one end of the handle, a shaft mounted in the socket and projecting therefrom, a boss embracing said shaft and abutting against the socket, a helical spring having one end mounted in the boss, and means for attaching the opposing end of the spring to the rod, said means including a sleeve receiving the end of the spring and one end of the rod.

CLIFTON C. FOX.
DALE E. WILLITS.

REFERENCES CITED

The following references are of record in the file of this patent:

UNITED STATES PATENTS

| Number | Name | Date |
|---|---|---|
| 970,172 | Bloom et al. | Sept. 13, 1910 |
| 1,973,322 | Staples | Sept. 11, 1934 |
| 2,306,638 | Meisler | Dec. 29, 1942 |
| 2,327,650 | Klein | Aug. 24, 1943 |
| 2,351,734 | Backe | June 20, 1944 |

FOREIGN PATENTS

| Number | Country | Date |
|---|---|---|
| 835,881 | France | Jan. 5, 1939 |